United States Patent [19]

Pinault et al.

[11] Patent Number: 5,809,416
[45] Date of Patent: Sep. 15, 1998

[54] DEVICE FOR SEEKING CONNECTION OF A TERMINAL TO A NETWORK OF A MOBILE RADIO SYSTEM COMPRISING A PLURALITY OF NETWORKS

[75] Inventors: Francis Pinault; Christophe Jouin, both of Bois-Colombes, France

[73] Assignee: Alcatel Radiotelephone, Paris, France

[21] Appl. No.: 767,297

[22] Filed: Dec. 16, 1996

Related U.S. Application Data

[63] Continuation of Ser. No. 166,954, Dec. 15, 1993, abandoned.

[30]  Foreign Application Priority Data

Dec. 16, 1992 [FR] France .................................. 92 15203

[51] Int. Cl.⁶ ...................................................... H04Q 7/00
[52] U.S. Cl. .......................... 455/422; 455/432; 455/455; 455/552
[58] Field of Search ................................. 455/33.1, 33.2, 455/34.2, 53.1, 54.1, 54.2, 56.1, 62, 63, 33.4, 422, 432, 436, 437, 438, 439, 443, 444, 450, 455, 456, 517, 516, 507, 524, 551–552; 379/58, 59, 60, 63

[56]  References Cited

U.S. PATENT DOCUMENTS

| | | |
|---|---|---|
| 4,903,320 | 2/1990 | Hanawa ................................. 455/34.2 |
| 4,905,301 | 2/1990 | Kropp et al. ............................. 455/334 |
| 4,916,728 | 4/1990 | Blair . | 
| 5,101,500 | 3/1992 | Marui ..................................... 455/33.1 |
| 5,117,502 | 5/1992 | Onoda et al. ............................. 379/60 |
| 5,157,661 | 10/1992 | Kanai et al. .............................. 379/63 |
| 5,159,625 | 10/1992 | Zicker . |
| 5,203,015 | 4/1993 | George ................................. 455/186.1 |
| 5,222,248 | 6/1993 | McDonald et al. .................... 455/54.2 |
| 5,276,905 | 1/1994 | Hurst et al. ............................ 455/54.2 |

FOREIGN PATENT DOCUMENTS 0382309  8/1990  European Pat. Off. .

Primary Examiner—Reinhard J. Eisenzopf
Assistant Examiner—Doris To
Attorney, Agent, or Firm—Sughrue, Mion, Zinn, Macpeak & Seas, PLLC

[57]  ABSTRACT

A connection seeking device in a terminal of a mobile radio system seeks connection of the terminal to one network of a system which includes a plurality of networks. The system extends over a plurality of geographical entities each having at least one network. The terminal is affiliated to a home network belonging to a geographical entity of origin. The device seeks the connection to the home network when the terminal is connected to a network which does not belong to the geographical entity of origin.

7 Claims, 3 Drawing Sheets

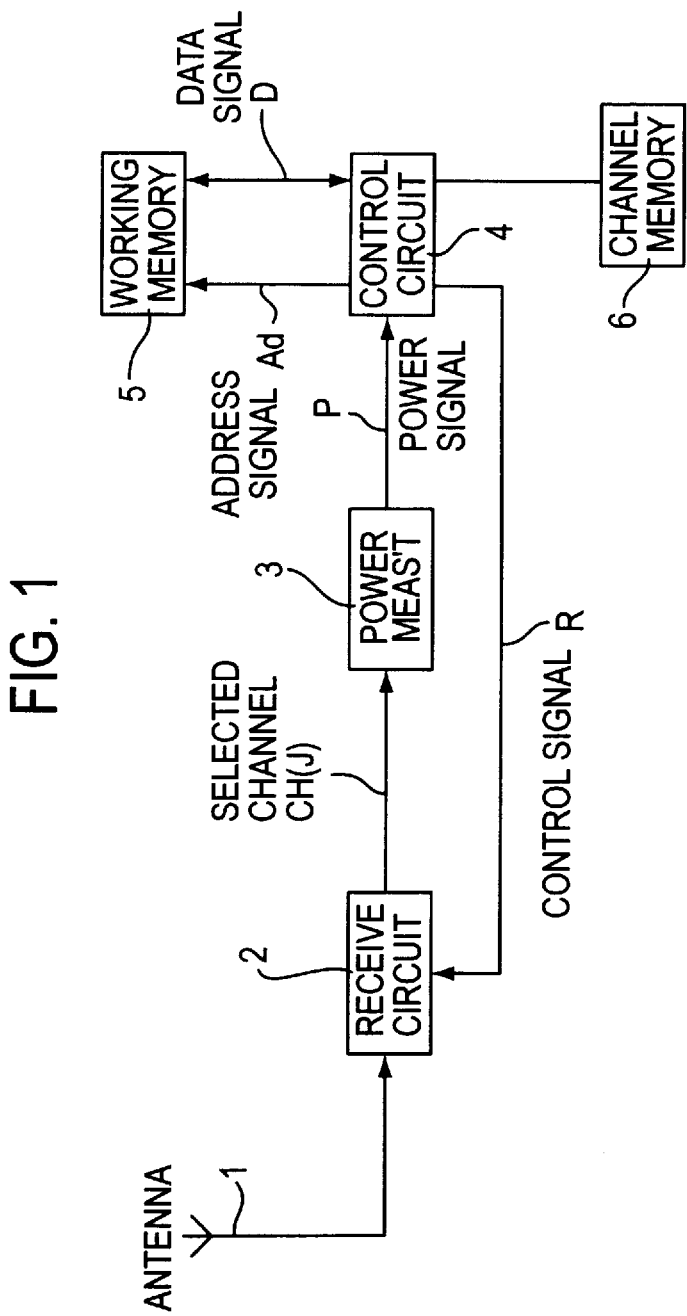

DEVICE FOR SEEKING CONNECTION OF A TERMINAL TO A NETWORK OF A MOBILE RADIO SYSTEM COMPRISING A PLURALITY OF NETWORKS

This is a Continuation of Application Ser. No. 08/166,954 filed Dec. 15, 1993 abandoned.

BACKGROUND OF THE INVENTION

1. Field of the Invention

The present invention concerns a device for seeking connection of a terminal to a network of a mobile radio system comprising a plurality of networks.

2. Description of the Prior Art

Reference is made here to mobile radio systems covering a plurality of geographical entities (countries, for example) as is the case with the GSM paneuropean digital cellular mobile radio system. A system of this kind comprises a plurality of radio networks usually managed by different operators, each network covering a territory corresponding to all of a country or to one or more regions within a country. These radio networks are connected to the cable networks of the corresponding countries so that a mobile radio system terminal can communicate with a cable network terminal.

There may be several radio networks in the same country, their coverage areas overlapping partly or totally. Then, if a terminal wishes to access the mobile radio system, because there is a choice the question arises which radio network it will connect to. To this end the terminal includes a connection seeking device to establish a list of the radio networks to which it could connect.

A particular terminal which can operate throughout the mobile radio system is affiliated to a specific radio network, the home network, in just the same way as a telephone terminal is affiliated to a specific cable network. The reason for this is that the terminal is the means of obtaining services such as speech or data communication provided by the network operator who needs to know the identity of the terminal, in order to bill for the services provided if for no other reason.

It is desirable for priority to be given to connecting a terminal to its home network. The terminal user has an agreement with an operator who provides certain services that a different operator may not necessarily be able to supply; this applies to data communications, for example. Also, if a terminal connects to a radio network that it is convenient to refer to as a "visitor" network separate from its home network, this presupposes that the two operators concerned have an agreement authorizing such connection. This is not always the case, but assuming that it is, it is necessary for information to be exchanged between the two networks for the terminal's calls to be managed. The first item to come to mind is the cost of the service provided on the visitor network which must be passed on to the terminal's home network in order for the user to be billed accordingly.

It is therefore known for the connection seeking device of a terminal to be activated regularly either by manual action of the user or automatically when the terminal is connected to a visitor network of the same country as its home network, so that it breaks the connection with the visitor network to establish a new connection with the home network. This procedure is described in GSM recommendation 03.22 and is applied only if the visitor network is in the same country as the home network, the country of origin. It seems illogical to apply it if the visitor network is in another country because the networks are designed to serve the terminals of a given country. For example, a terminal whose country of origin is France and which is located in Denmark must not attempt to connect to its home network as it would necessarily fail.

Over and above this, the procedure mentioned above naturally consumes power which reduces the operating time between battery recharging/replacement in the case of a terminal having a battery of limited capacity. This is further argument for not applying this procedure when the visitor network is not in the country of origin.

However, if the terminal is in a border area between two countries, it can have access to a network of each country because, given the type of transmission used, it is not possible to limit the coverage area of a network precisely to the border. It can even happen that the terminal, even though in its country of origin, can connect only to a network of another country because transmission conditions (radio propagation conditions) prevent it connecting to its home network or to a visitor network of its country of origin. This occurs if it is in a shadow area in the sense in which this term is used in the radio art, behind an obstacle such as a mountain which prevents this connection, for example. The terminal is thereby penalized and can no longer access its home network even if transmission conditions should become favorable again.

An object of the present invention is to enable a terminal to establish a new connection with its home network when it is connected to a visitor network which is not of its country of origin.

SUMMARY OF THE INVENTION

This object is achieved by providing in the terminal a device for seeking connection to a network of a mobile radio system comprising a plurality of networks, said system extending over a plurality of geographical entities each having at least one network, the terminal being affiliated to a home network belonging to a geographical entity of origin, the device comprising seek means for seeking the connection to the home network when it is connected to a network which does not belong to the geographical entity of origin.

As already mentioned, the above device consumes power even if it is activated at relatively widely spaced time intervals.

A further object of the present invention is to reduce the power consumption of the terminal.

This object is achieved by having the device hold a table listing the geographical entity of origin and the geographical entities adjacent thereto and comprise selector means for activating the seek means only if the network to which it is connected belongs to a geographical entity in said table.

An additional problem arises when the connection to the home network can be achieved but would be of mediocre quality with a high risk of being interrupted.

A further object of the invention is therefore preventing the achieving of a connection that is highly unsatisfactory from the terminal'point of view This object is achieved by having the device hold a quality indicator in respect of the connection to said home network established during scanning of all the networks to which a connection can be achieved and comprise inhibitor means for preventing connection to said home network if said quality indicator is less than a predetermined quality threshold.

In one specific embodiment of the device the terminal is connected to a network by a connection whose quality constitutes a reference value and the quality threshold is the sum of a predetermined safety margin and said reference value.

Advantageously the connection between the terminal and any network of the mobile radio system uses at least one radio channel conveying a control signal and said quality indicator represents the power at which the terminal receives the respective control signal.

The invention is now described in more detail by way of purely illustrative example and with reference to the appended drawings.

BRIEF DESCRIPTION OF THE DRAWINGS

FIG. 1 shows the main components of a terminal needed to implement the invention.

DETAILED DESCRIPTION OF THE PREFERRED EMBODIMENT

Figure 2A:
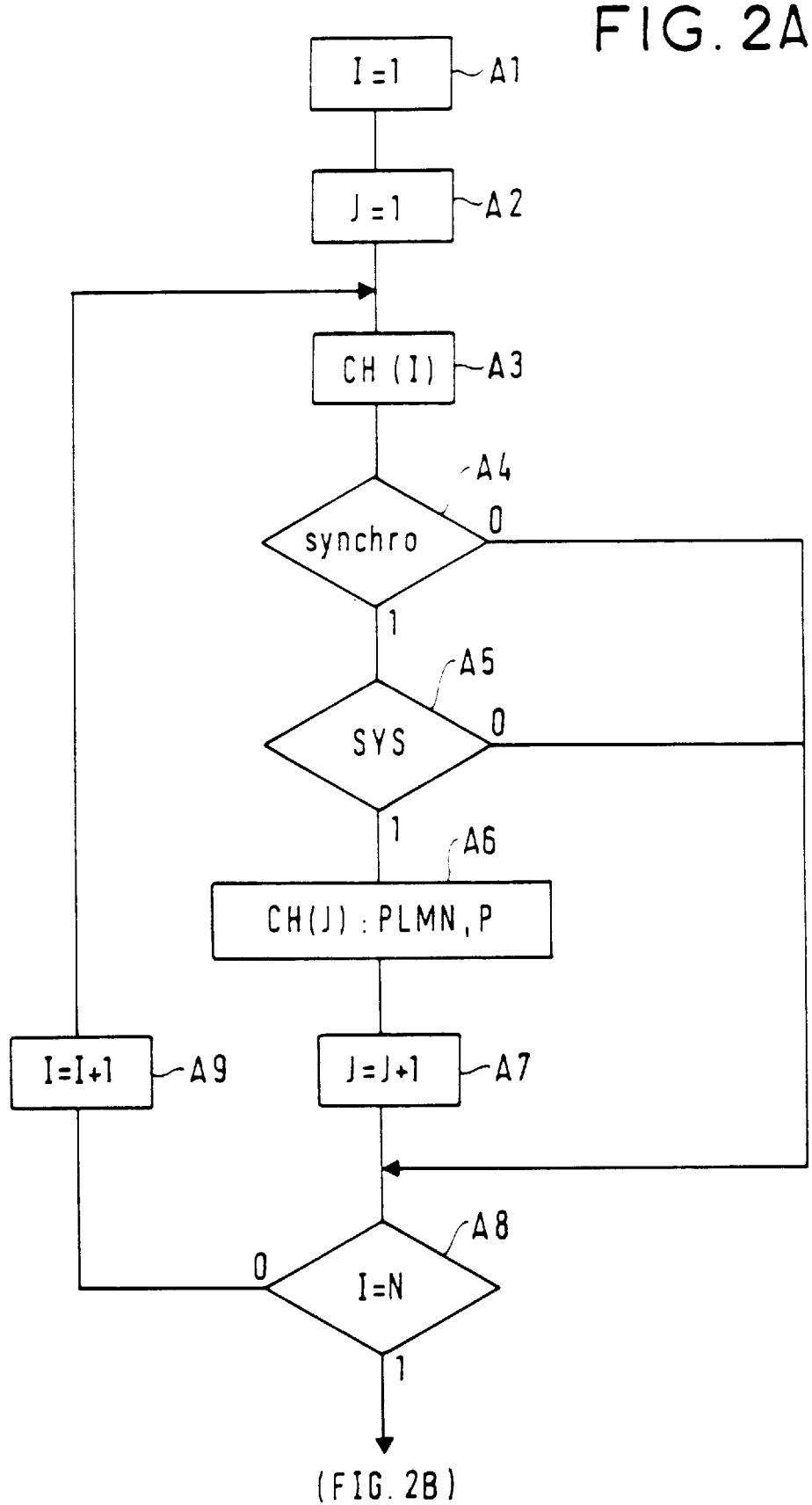
FIGS. 2a and 2b constitutes showing the operation of the connection seeking device.

Before seeking a connection a terminal must carry out a synchronization procedure which will now be described in outline in order to clarify the explanation.

In mobile radio systems such as the GSM paneuropean digital mobile radio system, for example, a terminal communicates with a base station by way of communication channels conveying radio signals. These systems comprise a plurality of channels for transmissions from the terminals to the base stations or for transmissions from the base stations to the terminals.

These channels include a control channel which is transmitted continuously and which enables a terminal to access the system via the base station transmitting this channel in order to set up calls. The terminal must therefore identify this control channel in order to acquire the information enabling it to declare itself in the system. This information includes synchronization information and for this reason this procedure is usually called the synchronization procedure.

A two-stage method is usually adopted to achieve synchronization. In a first stage the terminal measures the power on all received channels. The terminal then attempts to synchronize with the channel received at the highest power. If it fails to do so it tries the other channels in decreasing received power order until it is able to synchronize. This method is that which is the subject of GSM Recommendations 4.08 version 3.11.0 and 5.08 version 3.7.0.

The synchronization procedure is carried out systematically whenever the terminal is switched on and also, and more generally, after any loss of synchronization, i.e. if the link between the base station and the terminal is interrupted. It is also undertaken in the instance of interest here, i.e. when the terminal is already connected to a network, for the purpose of identifying the various networks to which it could connect.

Referring to FIG. 1, in a known manner, the terminal essentially comprises an antenna 1 to receive the various channels, there being N channels, a receive circuit 2 such as a frequency synthesizer connected to the antenna 1 and which selects from these channels a tuning channel CH(I) in response to a control signal R, a power measuring circuit 3 which produces a power signal P representing the power on the tuning channel CH(I), and a control circuit 4 such as a microprocessor which produces the control signal R and which receives the power signal P and stores it in a working memory 5 by means of a data signal D at an address assigned to the tuning channel CH(I) by means of an address signal Ad.

Also in a known manner the control circuit 4 has access to the identity of all the channels that the terminal can receive. For example, there may be a channel memory 6 associating for each channel a set point value of the control signal R with an address in the working memory 5. Thus during a first period the control circuit 4 produces the control signal R with one of the set point values and stores the value of the power signal P in the working memory 5 at the address associated with this set point value in the channel memory 6. The control circuit repeats this operation for all set point values with the result that the working memory 5 contains a power value for each channel.

It then classifies the channels in the working memory 5 in decreasing power order, retaining for each channel an indication of the respective set point value. The result of this operation is thus a first list of the set point values classified in decreasing power order of the respective channels.

The operation of the terminal is now explained with reference to the block diagram shown in FIG. 2 and with the convention that a positive response to a test is assigned the value 1 and a negative response is assigned the value 0.

Referring to FIG. 2A, the control circuit 4 carries out an initialization phase in which it sets the value of I to 1 in a block A1 and the value of J to 1 in a block A2.

In block A3 the control circuit selects as the tuning channel CH(I) the receive channel identified by the index I, that at the Ith location in the working memory 6, using the respective set point value.

In block A4 the control circuit 4 causes the terminal to attempt synchronization by seeking the synchronization information present on each control channel. If this attempt fails the control circuit executes block A8 described later.

If synchronization is achieved the control circuit 4 causes the terminal to seek the system information i.e. the network PLMN which is transmitting the respective control channel (block A5). If this information cannot be found the control circuit executes block A8 described later.

If the system information is found, the control circuit 4 writes into a second list in the working memory 5 at the Jth location the set point value respective to the selected channel CH(J), the network PLMN and the power P at which this channel is received (block A6).

The value of J is then incremented by one (block A7).

In block A8 the control circuit 4 tests the value I to determine if all the receive channels have been examined. If I is less than N it increments it by one in block A9 in order then to execute block A3. If I is equal to N, however, this phase of operation is terminated and the result is the second list in the working memory 5 giving the characteristics of the M channels by means of which it is possible to connect to the system.

Figure 2B:
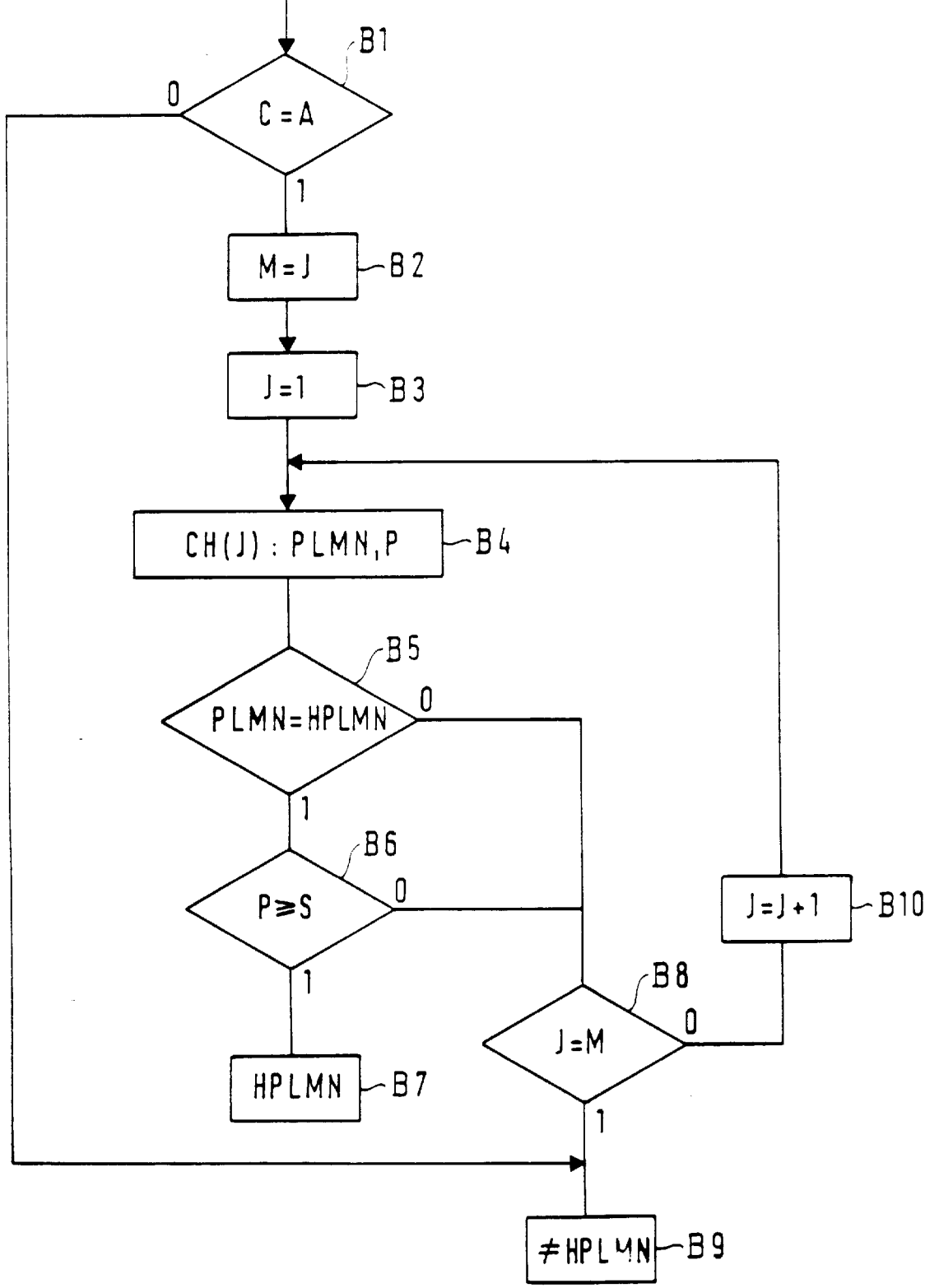

The connection seeking device proper, which essentially comprises the control circuit 4 and the working memory 5, is now described with reference to FIG. 2B.

In block B1 the control circuit 4 checks if country C of the visitor network to which the terminal is currently connected is an adjacent country A of the country of origin (the country of the home network HPLMN of the terminal). It is not necessary to seek a connection to the home network if the terminal is very far away from the country of origin. For example, the terminal holds a table in a memory area which could be part of the channel memory 6. This table lists the identification codes of the country of origin and the various countries A adjacent to it. Thus if the country of origin is France, this table lists France, Belgium, Luxembourg, Germany, Switzerland, Italy and Spain. The control circuit 4 has previously memorized the code of the country C of the network to which it is currently connected and checks if this code is in the table. If not, it executes block B9 described later. If yes, it executes an initialization phase beginning with block B2.

It is important to realize that execution of block B1, although having its own advantages, is not strictly necessary to implementation of the invention. If this option is not chosen, the control circuit 4 goes direct to executing block B2 after block A8.

In block B2 the control circuit 4 assigns the value of J previously calculated to the variable M which represents the number of items in the second list. Then, in block B3, it assigns the value 1 to the variable J again.

The control circuit 4 then reads in the working memory 5 the Jth item of the second list in order to obtain the network PLMN and the power P of the respective control channel (block B4).

In block B5 the control circuit 4 checks if the network PLMN is the home network HPLMN. If not, it goes directly to executing block B8 described later. If yes, it executes block B6.

In block B6 the control circuit 4 checks if the respective control channel is received with sufficient power P. The terminal must not connect to a network if the connection would have to be interrupted shortly afterwards because of insufficient quality. It is therefore prudent to ensure that the connection to the home network HPLMN is authorized only if the power P exceeds a predetermined threshold S. This threshold S may be set absolutely or defined relative to the reference power with which the control signal transmitted by the visitor network to which the terminal is currently connected is transmitted. In this latter case the threshold S is the sum of the reference power and a safety margin which can have a positive, null or even negative value. The control circuit 4 which has this previously stored predetermined safety margin and the reference power acquired during synchronization to the visitor network is therefore able to calculate the threshold S. The quality of connection has been assessed here by assessing its power. The invention is equally applicable if it is assessed by means of some other indicator, such as an error rate, for example.

It is important to realize that execution of block B6, although having its own advantages, is not strictly necessary to implementation of the invention. If this option is not chosen the control circuit B goes directly to executing block B7 after block B5 if in the latter it has been established that the network PLMN examined is the home network HPLMN. Note that in this case it is not necessary to memorize the power P of the channel being processed in block A6.

If this option is adopted, on the other hand, the control circuit 4 executes block B8 described later if the power P of the selected channel CH(J) is below the threshold S; if not, it executes block B7.

In block B7 the control circuit establishes if it is possible to connect to the home network HPLMN using the selected channel CH(J) and commands the terminal accordingly. The means for establishing the connection are not described in more detail here as they are part of the prior art and are not within the scope of the present invention.

In block B8 the control circuit checks if all the channels in the second list have been examined, i.e. if J is equal to M. If not, it executes block B10 described later; if yes, it executes block B9.

In block B9 the control circuit 4 has already established that it is not possible to connect to the home network HPLMN. Subsequent actions are outside the scope of the present invention, but a simple solution is not to modify the connection already established.

In block B10 the control circuit 4 increments the value of J by one and executes block B4 again to examine the next channel in the second list.

The connection seeking device operates automatically, i.e. it repeats the series of operations described above with reference to blocks A1 through B10 in a regular manner. This repetition may be subject to a time-delay commanded by the control circuit 4, for example.

Also, the invention has been described in relation to networks belonging to countries. This is merely one example and the invention is equally applicable if these countries are replaced by geographical entities comprising more than one country or part only of a country. What is important is that a geographical entity of this kind comprise one or more networks and that these networks are limited to this entity: a network can cover all or part of the geographical entity but it cannot extend beyond its boundaries. The only exception to this is that explained in the preamble, and with which this invention is concerned, and is due to the mode of transmission: it is not possible to halt radio transmission on a predetermined boundary line.

There is claimed:

1. A device for seeking connection of a terminal to a network of a mobile radio system comprising a plurality of networks, each of said networks including a plurality of base stations, each of said base stations having a plurality of communication channels which are capable of providing network connections when synchronized with the terminal, said system extending over a plurality of countries each having at least one network and said terminal being affiliated with a home network belonging to a country of origin, the device comprising: seek means for seeking the connection of the terminal to said home network when the terminal is connected, using a communication channel with which the terminal is synchronized, to a network which does not belong to said country of origin; and means for establishing the connection of the terminal to said home network.

2. The device according to claim 1, further comprising means for holding a table listing only said country of origin and countries adjacent thereto, and selector means for activating said seek means only if the network to which the terminal is connected belongs to a country in said table.

3. The device according to claim 1, further comprising means for holding a quality indicator in respect to the connection to said home network established during scanning of all the networks to which a connection can be achieved, and inhibitor means for preventing connection to said home network if said quality indicator is below a predetermined quality threshold.

4. The device according to claim 3 wherein said terminal is connected to a network by a connection whose quality constitutes a reference value and said quality threshold is set relative to said reference value.

5. The device according to claim 3, wherein the connection between said terminal and any network of said mobile radio system uses at least one radio channel conveying a control signal, and said quality indicator represents a power at which said terminal receives the respective control signal.

6. In combination: a terminal; a mobile radio system comprising a plurality of networks, each of said networks including a plurality of base stations, each of said base stations having a plurality of communication channels which are capable of providing network connections when synchronized with the terminal, said system extending over a plurality of countries each having at least one network, said terminal being affiliated with a home network belonging to a country of origin; and seek means for seeking a connection of the terminal to said home network when the terminal is connected, using a communication channel with which the terminal is synchronized, to a network which does not belong to said country of origin.

7. The combination according to claim 6, further comprising means for holding a table listing only said country of origin and countries adjacent thereto, and selector means for activating said seek means only if the network to which the terminal is connected belongs to a country in said table.

* * * * *